(12) United States Patent
Zhang et al.

(10) Patent No.: US 11,522,370 B2
(45) Date of Patent: Dec. 6, 2022

(54) EQUALIZATION CIRCUIT, A CHARGING DEVICE AND AN ENERGY STORAGE DEVICE

(71) Applicant: LIAN ZHENG ELECTRONICS (SHENZHEN) CO., LTD., Shenzhen (CN)

(72) Inventors: Qixiao Zhang, Shenzhen (CN); Heyi Xu, Shenzhen (CN); Yanmei Zhan, Shenzhen (CN)

(73) Assignee: LIAN ZHENG ELECTRONICS (SHENZHEN) CO., LTD., Shenzhen (CN)

( * ) Notice: Subject to any disclaimer, the term of this patent is extended or adjusted under 35 U.S.C. 154(b) by 175 days.

(21) Appl. No.: 16/670,327

(22) Filed: Oct. 31, 2019

(65) Prior Publication Data

US 2020/0161877 A1    May 21, 2020

(30) Foreign Application Priority Data

Nov. 21, 2018   (CN) .......................... 201811391726.7

(51) Int. Cl.
*H02J 7/00*   (2006.01)

(52) U.S. Cl.
CPC .......... *H02J 7/0016* (2013.01); *H02J 7/0047* (2013.01); *H02J 7/00302* (2020.01); *H02J 7/00304* (2020.01); *H02J 7/00308* (2020.01); *H02J 7/00309* (2020.01)

(58) Field of Classification Search
USPC ........................................ 320/188, 122–123
See application file for complete search history.

(56) References Cited

U.S. PATENT DOCUMENTS

| 6,104,165 A | * | 8/2000 | Miyamoto | ............ | H01M 10/44 320/136 |
| 2004/0263119 A1 | * | 12/2004 | Meyer | ................. | H02J 7/00047 320/116 |

(Continued)

FOREIGN PATENT DOCUMENTS

| CN | 104901359 A | * | 9/2015 |
| CN | 206340988 U | * | 7/2017 |

(Continued)

OTHER PUBLICATIONS

European Search Report; EP Appln No. 19210797; dated Jan. 8, 2020; 12 pages.

*Primary Examiner* — Samuel Berhanu
(74) *Attorney, Agent, or Firm* — Stanek Lemon Crouse & Meeks, P.A.

(57) ABSTRACT

The present invention relates to an equalization circuit, a charging device, and an energy storage device connected between a battery pack and a charger. The battery pack comprises a plurality of cells connected in series. The equalization circuit comprises: a detection module used for detecting a voltage, temperature, and/or current of each cell; an auxiliary charging module used for providing a second charging current to the battery pack, wherein the second charging current is less than a first charging current provided by the charger to the battery pack; and a control module used for controlling the detection module and the auxiliary charging module.

5 Claims, 2 Drawing Sheets

(56) References Cited

U.S. PATENT DOCUMENTS

| | | | | |
|---|---|---|---|---|
| 2005/0156603 | A1* | 7/2005 | Lin .................. | H02J 7/0047 |
| | | | | 324/433 |
| 2010/0072947 | A1 | 3/2010 | Chan et al. | |
| 2010/0253285 | A1* | 10/2010 | Takahashi ............ | H02J 7/0016 |
| | | | | 320/118 |
| 2018/0152028 | A1* | 5/2018 | Hsiao .................. | H02J 7/0026 |
| 2019/0067957 | A1* | 2/2019 | Yeom ................. | H01M 10/441 |

FOREIGN PATENT DOCUMENTS

| | | | |
|---|---|---|---|
| JP | 2004349186 | | 12/2004 |
| JP | 2013179739 | A * | 9/2013 |

\* cited by examiner

EQUALIZATION CIRCUIT, A CHARGING DEVICE AND AN ENERGY STORAGE DEVICE

CROSS-REFERENCE TO RELATED APPLICATIONS

The present application claims priority to Chinese Patent Application No 2018111726.7; filed Nov. 21, 2018, entitled EQUALIZATION CIRCUIT, CHARGING DEVICE, AND ENERGY STORAGE DEVICE, the disclosure of which is incorporated herein by reference in its entirety.

TECHNICAL FIELD

The present invention relates to the field of power electronics technologies, and in particular, to an equalization circuit, a charging device, and an energy storage device.

BACKGROUND

Following technological advancements in electronics, more and more electronic products adopt lithium-ion batteries as main power sources because lithium-ion batteries have several advantages such as compact size, long battery lifespan, and high energy density ratio. Yet, in the meantime, lithium-ion batteries have high requirements for charging and discharging conditions. In particular, equalization measures need to be taken to ensure safe and stable use of the battery pack when a lithium-ion battery pack is charged or discharged due to factors such as inconsistency of single bodies constituting a cell. If no equalization control is performed, the voltages of single cells in the battery pack will gradually differentiate with the increase in the number of charge-discharge cycles, and the lifespan of the battery pack will shrink.

Equalization methods found in the prior art may be divided into active equalization and passive equalization. Active equalization generally refers to an equalization circuit implemented using active components. For example, each string of cells of a battery pack is connected to a direct-current (DC) converter that is controlled using a switch. During charging, if it is detected that the voltage of any string of cells is lower than a threshold, a switch corresponding to the battery is turned on so that the DC converter charges the battery. The components of such an active equalization method is constrained—it usually requires, a complex peripheral circuit, which entails high costs and high maintenance. Passive equalization generally refers to an equalization circuit implemented using passive components. For example, each string of cells is connected in parallel to a resistor used for consuming the power of high-voltage cells so as to achieve overall equalization of a battery pack. It is simple and easy to promote such a passive equalization method to a large range of applications. However, charging the battery packer fully may be impossible in an actual equalization execution process, since the charging current of a charger is far greater than the generated equalizing current. When the charger is turned OFF, the single string of cells may not have been equalized by the equalizing current, resulting in incomplete charging.

As a result, an equalization circuit capable of effectively achieving full charging of a battery pack and prolonging the lifespan of the battery pack is currently needed.

SUMMARY

In view of the aforementioned problem existing in the prior art, the present invention provides an equalization circuit connected between a battery pack and a charger, the battery pack comprising a plurality of cells connected in series, wherein the equalization circuit comprising:

a detection module used to detect a voltage, a temperature, and/or a current of each cell;

an auxiliary charging module (namely, a small current charging module) used to provide a second charging, current to the battery pack, wherein the second charging current is less than a first charging current provided by the charger to the battery pack; and a control module used to control the detection module and the auxiliary charging module Preferably, the control module controls turning the auxiliary charging module ON or OFF according to a detection result of the detection module.

Preferably, the control module judges, according to the detection result of the detection module, whether the detection result satisfies a turning ON condition of the auxiliary charging module, wherein the turning ON condition comprises at least one of the following: a maximum voltage difference between the cells in the battery pack reaches a corresponding preset threshold, a total voltage of the battery pack reaches a corresponding preset threshold, an average voltage of the cells in the battery pack reaches a corresponding preset threshold, a highest voltage of the cells in the battery pack reaches a corresponding preset threshold, remaining power corresponding to the battery pack reaches a corresponding preset threshold, and after any cell in the battery pack triggers over-voltage protection, a voltage of the cell recovers to, a corresponding preset threshold allowing charging.

Preferably, the control module is further used to control starting or stopping charging/discharging of the battery pack according to the detection result of the detection module.

Preferably, if the detection result of the detector module shows that the temperature and/or the voltage and/or the current of any cell in the battery pack does not conform to a preset range, then the control module controls the battery pack to enter a charging/discharging protection mode, wherein the charging/discharging protection mode refers to that the battery pack enters a state of stopping charging/discharging.

Preferably, after the battery pack stops charging, the control module controls the battery pack to resume charging when the detection result shows that temperatures and voltages of all cells in the battery pack recover to preset ranges.

Preferably, when the control module controls the battery pack to resume charging, it is first judged whether the detection result satisfies the turning ON condition of the auxiliary charging module; if so, the auxiliary charging, module is controlled to charge the battery pack; otherwise, the charger is controlled to charge the battery pack.

Preferably, the charging protection mode comprises charging over-current protection, charging over-temperature protection, charging low-temperature protection, charging single-cell over-voltage protection, and charging battery total voltage over-voltage protection for the battery pack.

Preferably, the discharging protection mode comprises discharging over-current protection, discharging short-circuit protection, discharging over-temperature protection, discharging low-temperature protection, discharging single-cell low-voltage protection, and discharging battery total voltage low-voltage protection for the battery pack.

Preferably, each cell in the battery pack is connected to a passive equalization module used for high-voltage discharging of the cell, and the control module is further used for controlling turning the passive equalization module ON or OFF according to the voltage of each cell.

Preferably, when the voltage of any cell reaches a third preset threshold, and the voltage difference between a highest voltage and a lowest voltage of the cells reaches a fourth preset threshold, the control module turns on a passive equalization circuit corresponding to the cell.

Preferably, when a charging current of the battery pack is the second charging current provided by the auxiliary charging module, if a discharging current after the passive equalization circuit is turned on is a third discharging current, then a charging/discharging, current of the cell corresponding to the passive equalization circuit is the difference between the second charging current and the third discharging current, wherein if the third discharging current is greater than the second charging current, the cell is in a discharging state; otherwise, the cell is in a charging state.

Preferably, the equalization circuit further comprises a first switch used to turn charging of the battery pack ON or OFF and a second switch used to turn discharging of the battery pack to a load ON or OFF, and the control module is separately connected to the first switch, the second switch, and the auxiliary charging module.

Preferably, the first switch comprises a first field effect transistor having a parallel diode, the second switch comprises a second field effect transistor having a parallel diode, a source of the first field effect transistor is connected to, a negative electrode of the battery pack, a drain of the first field effect transistor is connected to a source of the second field effect transistor, a drain of the second field effect transistor is connected to a positive electrode of the battery pack through the charger, and a gate of the first field effect transistor and a gate of the second field effect transistor are respectively connected to the control module.

Preferably, the auxiliary charging module comprises a voltage adjustment unit used for adjusting the second charging current and a third switch used for turning the auxiliary charging module ON or OFF, wherein the third switch is connected to the control module.

Preferably, the third switch comprises a triode, a base of the triode is separately connected to the control module and one end of the voltage adjustment unit, a collector of the triode is connected to a drain of the second switch, and an emitter of the triode is separately connected to a drain of the first switch, the positive electrode of the battery pack, and the other end of the voltage adjustment unit through a resistor.

Preferably, positive and negative electrodes of any cell of the battery pack are separately connected in parallel to a resistor, sand are further connected to a fourth switch used to control connection or disconnection of the parallel circuit, and the control module is connected to the fourth switch corresponding to each cell through the detection module.

According to another aspect of the present invention, a charging device is further provided, the charging device comprising a charger and the equalization circuit described above that is connected to the charger.

According to another aspect of the present invention, an energy storage device is further provided, the energy storage device comprising a battery pack and the equalization circuit described above that is connected to the battery pack.

Preferably, the battery pack comprises a plurality of cells connected in series and a passive equalization circuit connected to each cell and used to perform high-voltage discharging on the corresponding cell.

The equalization circuit, charging device, and energy storage device provided in the present invention achieve battery pack changing using a small current charging module in combination with a conventional charger. A controller can perform gradient control on a charging or discharging current of each cell according to collected voltage and capacity status of each cell in the battery pack, so as to rapidly reduce the voltage or capacity difference between the cells in the battery pack, thereby achieving effective equalization of the battery pack and preventing cell passivation. The equalization circuit further provides a protection mode and a small current charging mode, and thus can effectively protect charging and discharging safety of the battery pack and prolong the service life of the battery pack.

DETAILED DESCRIPTION

Figure 1:
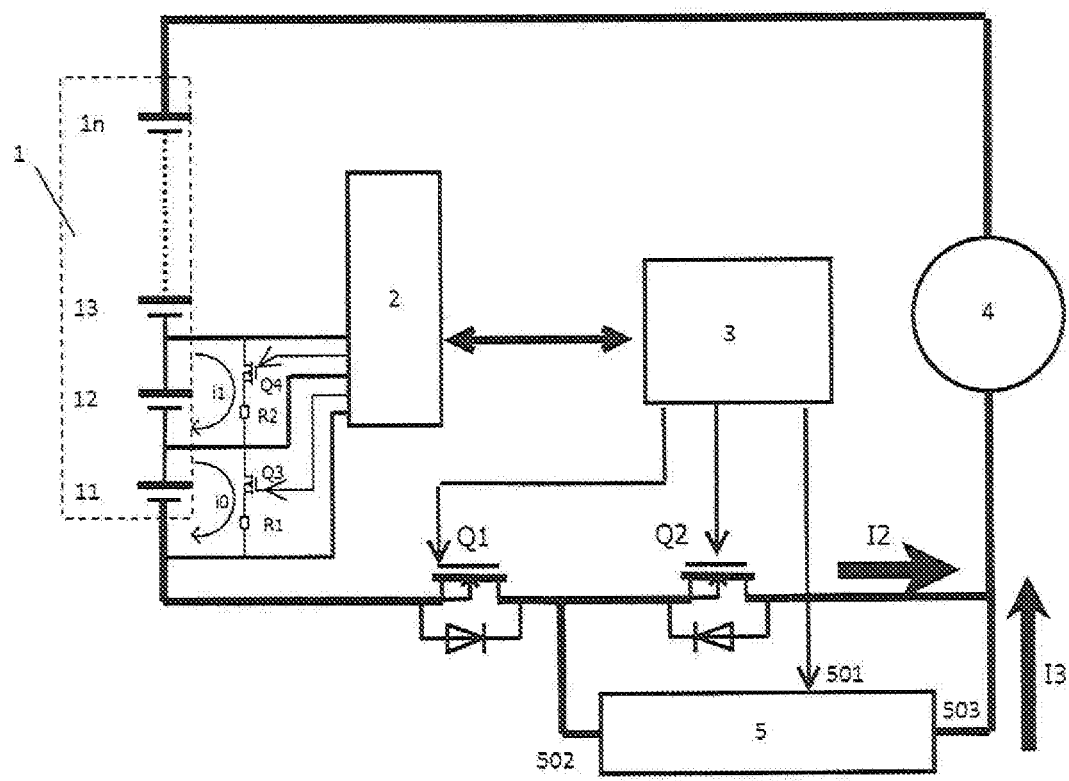
FIG. 1 is a schematic diagram illustrating a circuit in a preferred embodiment of the present invention.

The present invention provides an equalization circuit connected between a battery pack and a charger, wherein the battery pack includes a plurality of cells connected in series, the equalization circuit including:
a detection module used to detect a voltage, a temperature, and/or a current of each cell;
an auxiliary charging module (namely, a small current charging module) used to provide a second charging current to the battery pack, where the second charging current is less than a first charging current provided by the charger to the battery pack; and
a control module used to control the detection module and the auxiliary charging module.

Preferably, the control module controls turning the auxiliary charging module ON or OFF according to a detection result of the detection module.

Preferably, the control module judges, according to the detection result of the detection module, whether the detection result satisfies a turning ON condition of the auxiliary charging module, wherein the turning ON condition comprises at least one of the following: a maximum voltage difference between the cells in the battery pack reaches a corresponding preset threshold, a total voltage of the battery pack reaches a corresponding preset threshold, an average voltage of the cells in the battery pack reaches a corresponding preset threshold, a highest voltage of the cells in the battery pack reaches a corresponding preset threshold, remaining power corresponding to the battery pack reaches a corresponding preset threshold, and after any cell in the battery pack triggers over-voltage protection, a voltage of the cell recovers to a corresponding preset threshold allowing charging.

Preferably, the control module is further used to control starting or stopping charging/discharging of the battery pack according to the detection result of the detection module.

Preferably, if the detection result of the detector module shows that the temperature and/or the voltage and/or the current of any cell in the battery pack does not conform to a preset range, then the control module controls the battery pack to enter a charging/discharging protection mode, wherein the charging/discharging protection mode refers to that the battery pack enters a state of stopping charging/discharging.

Preferably, after the battery pack stops charging, the control module controls the battery pack to resume charging when the detection result shows that temperatures and voltages of all cells in the battery pack recover to preset ranges.

Preferably, when the control module controls the battery pack to resume charging, it is first judged whether the detection result satisfies the turning ON condition of the auxiliary charging module; if so, the auxiliary charging module is controlled to charge the battery pack; otherwise, the charger is controlled to charge the battery pack.

Preferably, the charging protection mode includes charging over-current protection, charging over-temperature protection, charging low-temperature protection, charging single-cell over-voltage protection, and charging battery total voltage over-voltage protection for the battery pack.

Preferably, the discharging protection mode includes discharging over-current protection, discharging short-circuit protection, discharging over-temperature protection, discharging low-temperature protection, discharging single-cell low-voltage protection, and discharging battery total voltage low-voltage protection for the battery pack.

Preferably, each cell in the battery pack is connected to a passive equalization module used for high-voltage discharging of the cell, and the control module is further used to control turning the passive equalization module ON or OFF according to the voltage of each cell.

Preferably, when the voltage of any cell reaches a third preset threshold, and the voltage difference between a highest voltage and a lowest voltage of the cells reaches a fourth preset threshold, the control module turns on a passive equalization circuit corresponding to the cell.

Preferably, when a charging current of the battery pack is the second charging current provided by the auxiliary charging module, if a discharging current after the passive equalization circuit is turned on is a third discharging current, then a charging/discharging current of the cell corresponding to the passive equalization circuit is the difference between the second charging current and the third discharging current, wherein if the third discharging current is greater than the second charging current, the cell is in a discharging state; otherwise, the cell is in a charging state.

Preferably, the equalization circuit further comprises a first switch used to turn charging of the battery pack ON or OFF and a second switch used to turn discharging of the battery pack to a load ON or OFF, and the control module is separately connected to the first switch, the second switch, and the auxiliary charging module.

Preferably, the first switch includes a first field effect transistor having a parallel diode, the second switch includes a second field effect transistor having a parallel diode, a source of the first field effect transistor is connected to a negative electrode of the battery pack, a drain of the first field effect transistor is connected to a source of the second field effect transistor, a drain of the second field effect transistor is connected to a positive electrode of the battery pack through the charger, and a gate of the first field effect transistor and a gate of the second field effect transistor are respectively connected to the control module.

Preferably, the auxiliary charging module comprises a voltage adjustment unit used to adjust the second charging current and a third switch used to turn the auxiliary charging module ON or OFF, wherein the third switch is connected to the control module.

Preferably, the third switch comprises a triode, a base of the triode is separately connected to the control module and one end of the voltage adjustment unit, a collector of the triode is connected to a drain of the second switch, and an emitter of the triode is separately connected to a drain of the first switch, the positive electrode of the battery pack, and the other end of the voltage adjustment unit through a resistor.

Preferably, positive and negative electrodes of any cell of the battery pack are respectively connected in parallel to a resistor, and are further connected to a fourth switch used to control connection or disconnection of the parallel circuit, and the control module is, connected to the fourth switch corresponding to each cell through the detection module.

According to another aspect of the present invention, a charging device is further provided, the charging device including a charger and the equalization circuit described above that is connected to the charger.

According to another aspect of the present invention, an energy storage device is further provided, the energy storage device comprising a battery pack and the equalization circuit described above that is connected to the battery pack.

Preferably, the battery pack comprises a plurality of cells connected in series and a passive equalization circuit connected to each cell and used to perform high-voltage discharging on the corresponding cell.

In order to make the objectives, technical solutions, and advantages of the present invention clearer, the present invention is further described in detail below through specific embodiments with reference to the accompanying drawings. It should be understood that the specific embodiments described herein are only intended to explain the present invention, rather than to limit the present invention.

In the prior art, a protection circuit is usually provided for a lithium-ion battery pack so as to prevent heat increase, sparks, burning, or even explosion caused by over-charging, over-discharging, over-current, short-circuit and so on of a lithium-ion battery pack. When the battery pack is charged using a constant current source, a constant voltage source, or a constant power source, if cells connected in series have inconsistent capacities, a large-capacity cell would thus trigger a battery management system (BMS) to stop charging as a result of charging over-voltage protection. Even if the BMS restarts charging through an existing equalization method of using a parallel resistor to consume the large-capacity cell, the charging time of the restart would be too short since an equalizing current is far less than a normal charging current. As a result, a small-capacity cell would be insufficiently charged and passivated. With the increase in the number of charge-discharge cycles, the overall capacity of the battery pack would be attenuated, and the service life of the battery pack would be shortened.

To this end, the inventor has proposed an equalization circuit upon research. A charger is combined with a small current charging module, so as to provide compatibility with charging and discharging of general lithium-ion battery packs and ensure charging and discharging consistency between serially connected cells in a battery pack.

FIG. 1 is a schematic diagram illustrating a circuit in a preferred embodiment of the present invention. As shown in FIG. 1, the equalization circuit provided in the present invention can be used to achieve capacity equalization between serially connected cells in the battery pack when a charger 4 is used to charge a battery pack 1 or when the battery pack 1 itself discharges. The equalization circuit includes the following: an analog front end (AFE) 2 electrically connected to the battery pack 1 and used to collect voltages of the serially connected cells in the battery pack and to collect a temperature of a cell case; a controller (MCU) 3 communicatively connected to the AFE 2 and used to generate various control instructions according to voltage information and temperature information collected by the analog front end 2; a charging switch Q2 and a discharging switch Q1 controlled by the controller 3; and a changer 4 and a small current charging module 5 controlled by the controller 3, the charging switch Q2, and the discharging switch QI and used to charge the battery pack 1. The charger 4 can be used to provide a normal charging current to the battery pack 1, and the small current charging module 5 can be used as an auxiliary changing module to provide to the battery pack 1 a small charging current less than the normal charging current.

Additionally, the equalization circuit may further include a passive equalization circuit, connected to each cell in the battery pack 1, where the passive equalization circuit includes a resistor used to achieve high-voltage discharging of the cell and a switch used to control connection and disconnection of the passive equalization circuit. In one embodiment of the present invention, the aforementioned passive equalization circuit may be integrated in a battery management system.

The battery pack 1 includes n cells connected in series, namely cells 11, 12, . . . , 1n. Each cell is connected to a passive equalization circuit used to achieve high-voltage discharging equalization of the cell. The passive equalization circuit includes a resistor connected in parallel to the ceil and a switching tube separately connected to the analog front end 2 and the resistor, the switching tube used to control connection or disconnection of the passive equalization circuit. The following are shown in FIG. 1. Cell 11 is used as an example, where a source of a switching tube Q3 is connected to one end of a resistor R1, a drain of the switching tube Q3 is connected to a positive electrode of the cell 11, and the other end of the resistor R1 is connected to a negative electrode of the cell 11, so that the switching tube Q3 and the resistor R1 are connected in series and then jointly connected in parallel to the positive and negative ends of the cell 11. A gate driving end of the switching tube Q3 is connected to the analog front end 2, and the analog front end 2 is further connected to the positive and negative electrodes of the cell 11 so as to collect the voltage of the cell 11 in real time.

The charging switch Q2 and the discharging switch Q1 are each field effect transistors having parallel diodes. Gate driving ends of the charging switch Q2 and the discharging switch Q1 are each connected to the controller 3. A source of the discharging switch Q1 is connected to a negative electrode of the battery pack 1, and a drain of the discharging switch Q1 is separately connected to a source of the charging switch Q2 and an input end 502 of the small current charging module 5. A drain of the charging switch Q2 is connected to a positive electrode of the battery pack 1 and an output end 503 of the small current charging module 5 through the charger 4, and a control end 501 of the small current charging module 5 is connected to the controller 3.

In one embodiment of the present invention, the aforementioned battery pack may include a plurality of serially connected batteries or cells or energy storage devices with similar functions.

Figure 2:
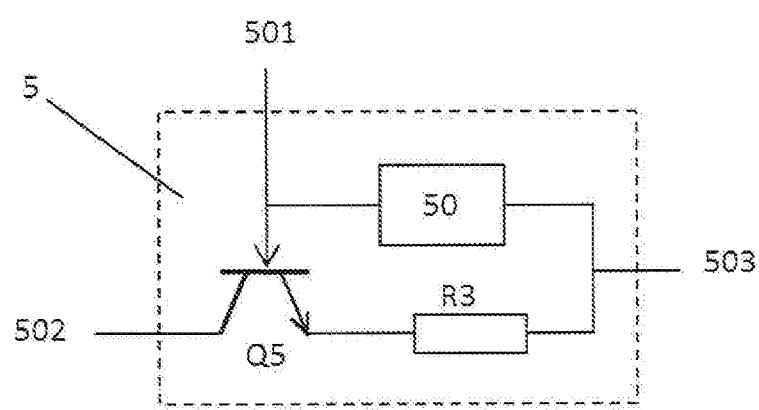
FIG. 2 is a schematic diagram illustrating an internal circuit, of a small current charging module provided in a preferred embodiment of the present invention.

FIG. 2 is a schematic diagram illustrating an internal circuit of a small current charging module provided in a preferred embodiment of the present invention. As shown in FIG. 2, the small current charging module 5 includes a voltage adjustment module 50, a resistor R3, and a switching tube Q5 used to control turning ON and OFF of the small current charging module 5 according to a control instruction generated by the controller 3. The switching tube Q5 may be a triode, where a base thereof serves as the control end 501 of the small current charging module 5 and is connected to one end of the voltage adjustment module 50, a collector of the triode serves as the input end 502 of the small current module 5, and an emitter of the triode is connected to one end of the resistor R3. The other end of the resistor R3 is connected to the other end of the voltage adjustment module and serves as the output end 503 of the small current charging module 5.

In operation, the aforementioned equalization circuit may have the following four operation modes, namely a charging mode, an equalization mode, a protection mode, and a discharging mode. In actual application, the equalization circuit provided in the present invention is applicable to an intra-interface lithium-ion battery pack (that is, the same interface is used for charging and discharging) and is also applicable to an inter-interface lithium-ion battery pack (that is, different interfaces are used for charging and discharging). Detailed description is made below with reference to the circuit diagrams shown in FIG. 1 and FIG. 2 by using an intra-interface lithium-ion battery pack as all example.

The charging mode may be divided into a conventional charging mode and an auxiliary charging mode. The conventional charging mode refers to a mode, of charging the battery pack 1 using the charger 4. In the conventional charging mode, the controller 3 controls the charging switch Q2 to close, the discharging switch Q1 to close and the remaining switches to open, where the charging current of each cell in the battery pack 1 is a first charging current I2. The auxiliary changing mode refers to a mode of charging the battery pack 1 using the small current charging module 5. In the auxiliary charging mode, the controller 3 controls the charging switch Q2 to open, the discharging switch Q1 to close, the switch Q5 to close, and the remaining switches to open, where the charging current of each cell in the battery pack 1 is a second charging current I3 and I3<I2.

Especially in the conventional charging mode, when the analog front end 2 detects that the state of the battery pack 1 satisfies at least one of the following turning ON conditions for the auxiliary charging mode, the controller 3 switches the charging mode of the battery pack 1 from the conventional charging mode to the auxiliary charging mode by controlling closing and opening of the aforementioned switches. The turning ON condition of the auxiliary charging mode specifically includes at least one of the following conditions:

Condition 1: A maximum voltage difference between the cells in the battery pack 1 reaches a corresponding preset threshold;

Condition 2: A total voltage of the battery pack 1 reaches a corresponding preset threshold;

Condition 3: An average voltage of the cells in the battery pack 1 reaches a corresponding preset threshold;

Condition 4: A highest voltage of the cells in the battery pack 1 reaches a corresponding preset threshold;

Condition 5: Remaining power SOC corresponding to the battery pack 1 reaches, a corresponding preset threshold;

Condition 6: After any cell in the battery pack 1 triggers over-voltage protection, when a voltage of the cell drops to a preset threshold allowing charging, the controller 3 turns on the small current charging module 5 to cause the battery pack 1 to directly enter the auxiliary charging mode.

The equalization mode refers to that in a charging mode (including a conventional charging mode, and an auxiliary charging mode), when the analog front end 2 detects inconsistency between voltages of the cells in the battery pack 1 and both a highest cell voltage and the voltage difference between the highest cell voltage and a lowest cell voltage reach corresponding preset thresholds, the controller 3 sends a control instruction to the analog front end 2. The analog front end 2 accordingly closes, according to the control instruction, a passive equalization circuit corresponding to a cell requiring high-voltage discharging so as to perform high-voltage discharging on the high-voltage cell.

Using the cell 11, the cell 12, and the cell 13 as an example, as shown in FIG. 1 and FIG. 2, it is assumed that the charging current of the battery pack 1 is I2 when the battery pack 1 is charged using the charger 4. When the analog front end 2 detects that the serially connected cells in the battery pack 1 satisfy at least one of the aforementioned six turning ON conditions for the auxiliary charging mode, the controller 3 controls the charging switch Q2 to open and, meanwhile, controls the switch Q5 to close, keeps the discharging switch Q1 closed, and starts the small current charging module 5 to charge the battery pack 1. At this time, the battery pack 1 enters the auxiliary charging mode from the conventional charging mode, and the charging current of the battery pack 1 is I3.

In the auxiliary charging mode, the following are assumed: the highest voltages corresponding to the cell 11, the cell 12, and the cell 13 are respectively U11, U12, and U13; a preset threshold corresponding to a highest cell voltage is U1; a preset threshold corresponding to the voltage difference between a highest cell voltage and a lowest cell voltage is U2; and U11>U12>U1>U13. If the analog front end 2 further detects that the voltage difference between U11 and U13 reaches the preset threshold U2, the controller 3 sends a control instruction to the analog front end 2 so that the analog front end 2 closes the switches Q3 and Q4; starts passive equalization circuits used for high-voltage discharging corresponding to the cell 11 and the cell 12; and keeps a switch corresponding to the cell 13 open (not shown in FIG. 1). At this time, for the cell 13, the charging current thereof is I3. For the cell 11 and the cell 12, the charging currents thereof are respectively I3 to I0 and I3 to I1. When it is assumed that I0>I3>I1, it can be known that the cell 11 is in a high-voltage discharging equalization state; the cell 13 in a small current charging state; and the cell 12 is in a smaller current charging state.

In view of the above, the equalization circuit provided in the present invention can rapidly and effectively reduce the voltage and capacity differences between the cells by gradient charging and discharging in a targeted manner according to current voltage levels of the cells in the battery pack 1. Furthermore, before over-voltage protection for charging of a BMS is triggered, more time is available for achieving capacity equalization of the battery pack 1 because of the small charging current.

The discharging mode refers to an operation mode where the battery pack 1 is used to supply power to a load (not shown in FIG. 1) connected between positive and negative electrodes of the battery pack 1. When the battery pack 1 switches from the conventional charging mode to the discharging mode, the controller 3 continues to keep the charging switch Q2 and the discharging switch Q1 closed. When the battery pack 1 switches from the auxiliary charging mode to the discharging mode, the controller 3 controls the switch Q5 to open, keeps the discharging switch Q1 closed, and controls the charging switch Q2 to close.

The protection mode refers to that the controller 3 performs cut-off protection for the charging and discharging statuses of the battery pack 1 according to temperature information, voltage information, and current information collected by the analog front end 2. The protection mode may be divided into a charging protection mode and a discharging protection mode. The charging protection mode refers to that when the battery pack 1 is in a charging mode, once the analog front end 2 detects any of over-current, over-temperature, low-temperature, total voltage over-voltage of the battery pack 1, or single-cell over-voltage of the battery pack 1, the controller 3 immediately controls the charging switch Q2 or Q5 to close. The discharging protection mode refers to that when the battery pack 1 is in a discharging mode, once the analog front end 2 detects any of over-current, short-circuit, over-temperature, low-temperature, single-cell low-voltage, or battery pack total voltage low-voltage of the battery pack 1, the controller 3 immediately controls the discharging switch Q1 to close.

In one embodiment of the present invention, the aforementioned auxiliary charging mode may be used for charging after the battery pack 1 recovers from the protection mode to the charging mode.

For example, when the battery pack 1 is in the conventional charging mode, the battery pack 1 may also directly enter the charging protection mode before it enters the equalization mode due to the temperature condition or charging state. That is, the battery pack 1 is in the conventional charging mode of charging using the charger 4. The controller 3 directly generates a control instruction to open the charging switch Q2 according to temperature information, voltage information, or current information detected by the analog front end 2 exceeding a preset range.

If the aforementioned charging protection mode is triggered because the temperature information detected by the analog front end 2 does not conform to a preset range, once the temperature condition changes (for example, natural cooling occurs), when the temperature condition detected by the analog front end 2 recovers to the preset range, the controller 3 generates a control instruction of resuming charging to close the switch Q5 so that the battery pack 1 resuming charging directly enters the auxiliary charging mode.

If the aforementioned charging protection mode is triggered because the voltage/current information detected by the analog front end 2 does not conform to a preset range and if the cells have inconsistent voltages, after opening the charging switch Q2, the controller 3 compares a current voltage value of each cell detected by the analog front end 2 with a preset threshold and opens a switch (such as Q3 or Q4 shown in FIG. 1) in a passive equalization circuit, corresponding to a cell requiring high-voltage discharging. After the analog front end 2 detects that the current status of the battery pack 1 satisfies a charging resuming condition (for example, a total voltage of the battery pack 1 conforms to a preset range or a voltage of any cell conforms to a preset range), the controller 3 generates a control instruction of resuming charging and judges, according to the current state of each cell in the battery pack 1 detected by the analog front end 2, whether at least one of the aforementioned six turning ON conditions for the auxiliary charging mode is satisfied. If so, the switch Q4 is controlled to close so that the battery pack 1 resuming charging directly enters the auxiliary charging mode. If not, the charging switch Q2 is controlled to close so that the battery pack 1 resuming charging enters the conventional charging mode.

According to another aspect of the present invention, a charging device used for charging a lithium-ion battery is further provided, where the device may include the equalization circuit described above and a conventional charger connected to the equalization circuit.

Although the equalization circuit provided in the present invention is described in the aforementioned embodiments by using a small current charging module including a triode, a resistor, and a voltage adjustment module as an example, those skilled in the art should understand that small current charging modules having other internal structures, for example, a small current charging circuit including electronic elements such as a capacitor and a current adjustment module, may also be used to implement the function of providing a small charging current.

Although the present invention has been described through preferred embodiments, the present invention is not limited to the embodiments described herein and further includes various changes and variations made without departing from the scope of the present invention.

The invention claimed is:

1. An apparatus comprising:
a detection module used to detect a state of each cell of a battery pack comprising a plurality of cells;
an auxiliary charging module used to provide a second level of charging current to the battery pack, wherein the second charging current is less than a first level of charging current provided by a main charger to the battery pack;
a first switch used to control charging of the battery pack and a second switch used to control discharging of the battery pack to a load; and
a control module used to control the detection module and the auxiliary charging module, wherein the auxiliary charging module comprises a voltage adjustment unit used for adjusting the second level of charging current and a third switch that controls the auxiliary charging module, wherein the third switch is connected to the control module and wherein the third switch comprises a triode, a base of the triode is separately connected to the control module and one end of the voltage adjustment unit, a collector of the triode is connected to a drain of the second switch, and an emitter of the triode is separately connected to a drain of the first switch, a positive electrode of the battery pack, and the other end of the voltage adjustment unit through a resistor.

2. The apparatus according to claim 1, wherein positive and negative electrodes of any cell of the battery pack are separately connected in parallel to a resistor, and are further connected to a fourth switch used for controlling connection or disconnection of the resistor, and the control module is connected to the fourth switch corresponding to each cell through the detection module.

3. A charging device, comprising the main charger and the apparatus according to claim 1.

4. An energy storage device, comprising the battery pack and the apparatus according to claim 1.

5. The energy storage device according to claim 4, wherein the cells are connected in series and further comprising a passive equalization circuit connected to each cell.

* * * * *